Sept. 21, 1965  H. NIRENBERG  3,207,431
DIFFERENTIAL ACTUATING MECHANISM FOR FRANKING MACHINES
Filed Oct. 16, 1963  6 Sheets-Sheet 1
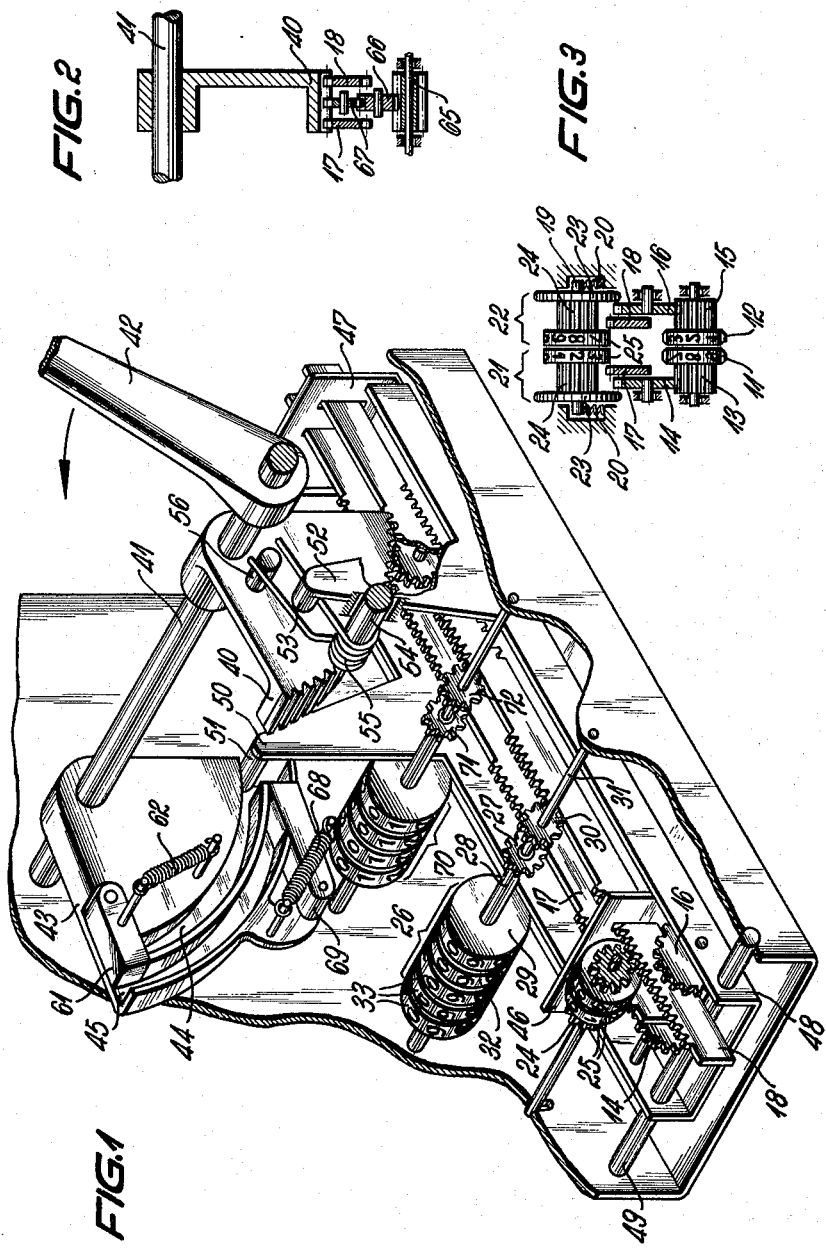
INVENTOR
HANS NIRENBERG
Karl G. Ross
AGENT Sept. 21, 1965   H. NIRENBERG   3,207,431
DIFFERENTIAL ACTUATING MECHANISM FOR FRANKING MACHINES
Filed Oct. 16, 1963   6 Sheets-Sheet 3

INVENTOR:
Hans Nirenberg

Karl F. Koss
AGENT

INVENTOR
HANS NIRENBERG

Karl F. Ross

AGENT.

Sept. 21, 1965   H. NIRENBERG   3,207,431
DIFFERENTIAL ACTUATING MECHANISM FOR FRANKING MACHINES
Filed Oct. 16, 1963   6 Sheets-Sheet 5

INVENTOR
HANS NIRENBERG

Karl F. Ross

AGENT

Sept. 21, 1965     H. NIRENBERG     3,207,431
DIFFERENTIAL ACTUATING MECHANISM FOR FRANKING MACHINES
Filed Oct. 16, 1963     6 Sheets-Sheet 6

*INVENTOR*
HANS NIRENBERG

*Karl F. Ross*
AGENT.

United States Patent Office 3,207,431
Patented Sept. 21, 1965

3,207,431
DIFFERENTIAL ACTUATING MECHANISM FOR FRANKING MACHINES
Hans Nirenberg, Frankfurt am Main, Germany, assignor to Telefonbau und Normalzeit G.m.b.H., Frankfurt am Main, Germany, a joint-stock company of Germany
Filed Oct. 16, 1963, Ser. No. 316,960
Claims priority, application Germany, Oct. 18, 1962,
T 22,883
10 Claims. (Cl. 235—101)

The invention relates to franking machines.

Franking machines, the stamping mechanisms of which are adjustable to various fee amounts have at least one counting mechanism which is in each case advanced by the stamped fee amount. For operating the counting mechanism, an adjustable drive is necessary. Known franking machines use toothed wheels with variable numbers of teeth for setting the counting mechanism according to the fee amount in question. Such toothed wheels require high accuracy in manufacture and are therefore expensive.

It is an object of the invention to more simply construct an adjustable drive for advancing a counting mechanism in a franking machine, whereby to enable less expensive construction of the franking machine.

It is a further object of the invention to provide a franking machine with at least one counting mechanism, which is in each case advanced by the stamped fee amount, a displaceable toothed rack being allocated to each numerical place of the amounts to be stamped, which can be coupled with the relevant setting wheel of the counting mechanism, the starting positions of which racks can be preset in accordance with the amount to be stamped, by a stamping-value setting device which can be coupled in. By the presetting of the starting positions of the racks it is enabled that in the subsequent sliding of the racks through a final amount, wheels of the counting mechanism are displaced through an amount corresponding to the rack presetting.

These and other objects and advantages of the invention will be apparent from the following description given with reference to the drawings which are given by way of example and in which:

FIG. 1 is a diagrammatic perspective view, partly broken away, of the essential parts of a displacing arrangement in a franking machine;

FIG. 2 is a sectional view of a driving device in the arrangement of FIG. 1;

FIG. 3 is a sectional view of a setting device in the arrangement of FIG. 1;

Figure 4A:
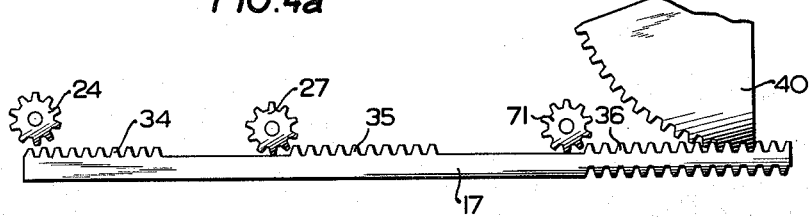
FIGS. 4 (a–d) illustrate a rack and the allocated setting wheels for the units place of the fee amount, in various working positions of the rack.
Figure 4B:
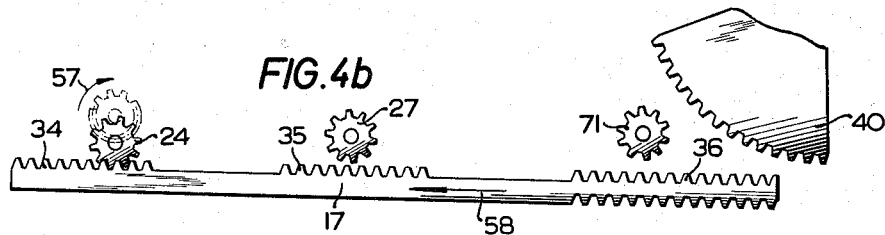
Figure 4C:
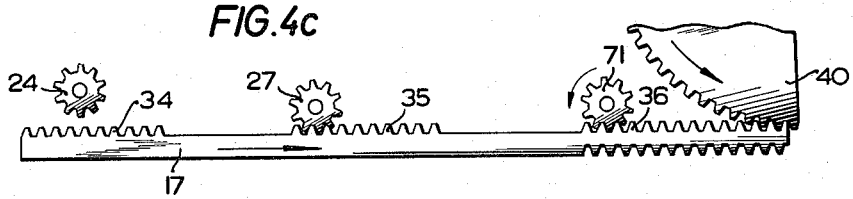
Figure 4D:
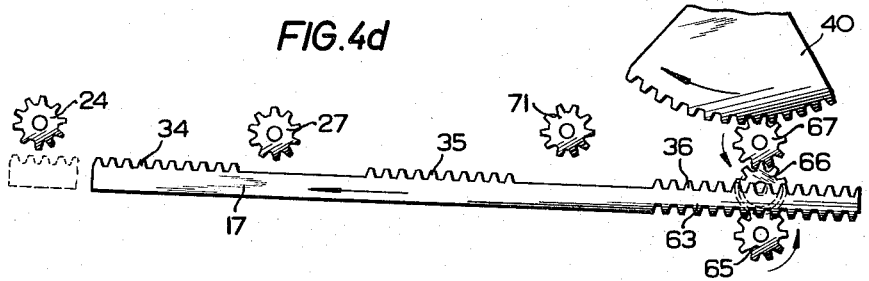

The franking machine of FIGS. 1 to 5 is suited for stamping two place fee amounts, that is to say fee amounts having two numerical digits, by means of stamping wheels 11 and 12. The stamping wheel 11 of the units place is fixedly connected with a toothed wheel 13 which meshes with an intermediate wheel 14. The stamping wheel 12 of the decade place is fixedly connected with a toothed wheel 15 which meshes with an intermediate wheel 16. Adjacent to the intermediate wheel 14 a rack 17 is arranged which is allocated to the units place. A rack 18 allocated to the decade place of the fee amount lies adjacent to the intermediate wheel 16.

Two value setting devices 21 and 22 are rotatably arranged on a shaft 19 which is normally held in the raised position by springs 20, and which can be brought closer to the intermediate wheels 14 and 16 by overcoming the force of the spring 20. Each of the two value setting members consists of a knurled disc 23, a toothed cylinder 24 and a number wheel 25.

If the shaft 19 of the value setting devices 21 and 22 is pressed downwardly by pressure on the knurled discs 23, then the toothed cylinder 24 of the setting member 21 for the units place of the fee amount comes into engagement with the intermediate wheel 14 and the rack 17, whereas the toothed cylinder 24 of the value setting member 22 of the decadic place of the fee amount comes into engagement with the rack 18 and the intermediate wheel 16. By rotating the knurled discs 23, a displacement of the stamping wheels 11 and 12 to the desired fee amount is possible, the rack 17 of the units place and the rack 18 of the decadic place of the fee amount being simultaneously displaced, the number wheels 25 indicating the set amount. The value setting devices 21 and 22 are held in their adjusted positions, by known means not illustrated, as soon as the engagement between the toothed cylinders 24 and the intermediate wheels 14 and 16 has been released by the action of the spring 20. Likewise, the adjusted positions of the stamping wheels 11 and 12 are maintained by known blocking members which are not illustrated.

The racks 17 and 18 serve for operating a counting mechanism 26 according to the fee amount set on the stamping wheels 11 and 12. In the region of the rack 17 of the units place, a pinion 27 is provided which is connected with a units wheel 29 of the counting mechanism 26 through a hollow shaft 28. In the region of the rack 18 of the decadic place of the fee amount, a pinion 30 is provided, which is coupled with the tens wheel 32 of the counting mechanism 26 by means of a shaft 31 guided through the hollow shaft 28. Between the individual number wheels 29, 32 and 33 of the counting mechanism 26, known devices which are not illustrated are provided for tens transfer, that is to say for advancing the number wheel of the next higher numerical place through one step as soon as the number wheel of the next lower numerical place rotates from the value 9 to the value 0.

The rack 17 for the units place of the fee amount carries three sets of toothing 34, 35, and 36 and the rack 18 of the decadic place of the fee amount carries three sets of toothing 37, 38 and 39. The toothings 34 and 35 of the rack 17 of the units place of the fee amount are arranged differently to the toothings 37, 38 of the rack 18 of the decadic place of the fee amount. This different arrangement is such, that the units wheel 29 and the tens wheel 32 of the counting mechanism 26 are not simultaneously displaced when both racks 17 and 18 are moved simultaneously.

A toothed segment 40 can engage in the toothings 36 and 39 of the racks 17 and 18, and is arranged on a shaft 41 which carries a handle 42. The shaft 41 furthermore carries a seqment shaped plate 43 with two control grooves 44 and 45. By rotation of the shaft 41, the racks 17 and 18 can be displaced by means of the toothed segment 40.

The racks 17 and 18 are slidably carried in guide plates 46 and 47 of a frame 48 which is rockable on a fixed shaft 49. An extension 50 of the frame 48 carries a stud 51 which normally engages in the control groove 44 of the plate 43. Another extension 52 of the frame 48 carries a stud 53 which serves as a counter support for one end of a helical spring 55 wound around a fixed stud 54, the other end of the spring 55 being supported against a stud 56 carried by the toothed segment 40.

Figure 5A:
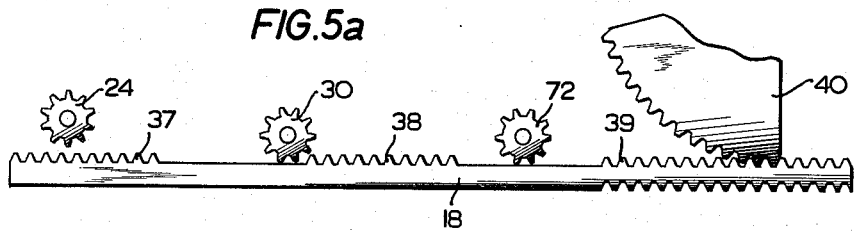
FIGS. 5 (a–d) illustrate the rack and the allocated setting wheels of the decadic place of the fee amount, in various working positions of the rack.
Figure 5B:
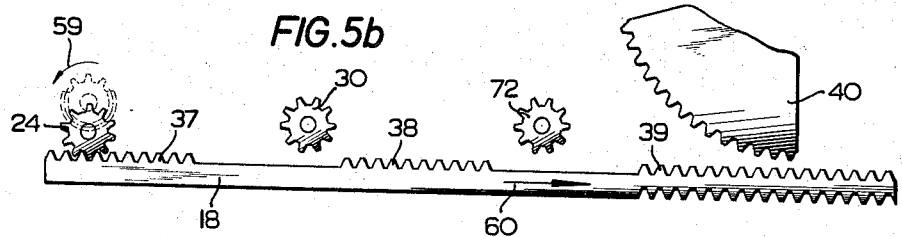

In the initial position illustrated in FIGS. 1, 4a and 5a, the stud 51 on the frame 48 lies in front of the end of the control groove 44. The frame can thus be swung by pressure on the knurled wheels 23 of the value setting devices 21 and 22 (FIG. 3), so that the racks 17 and 18 assume the positions illustrated in FIGS. 4b and 5b. The toothed cylinder 24 of the units setting device 21 now comes into engagement with the toothing 34 of the rack 17. For setting a value out of the zero position of the value setting device 21, this must be rotated in the direction of the arrow 57 (FIG. 4b), the rack 17 being displaced in the direction of the arrow 58. If for example the units value 8 is set, then the rack 17 is displaced by 8 teeth of the toothing 35 in the direction of the arrow 58. Thus also 8 teeth of the toothing 35 move below the pinion 27, which, as a result of the displacing of the frame 48, lies free from the toothing 35.

For setting the decade place of the fee amount, the decade setting device 22 is rotated in the direction of the arrow 59 (FIG. 5b), the rack 18 being displaced in the direction of the arrow 60. If for example the decadic value 5 is set, then the rack 18 is displaced towards the right hand side as viewed in FIG. 5b by 5 steps as viewed in FIG. 5b. As will be seen, the units setting device 21 and the decade setting device 22 are rotated in opposite directions for setting the amounts. Accordingly, the numerals are arranged in opposite sequences on the number wheel 25 of the units setting device 21 and on the number wheel 25 of the decade setting device 22. The same is true for the stamping wheels 11 and 12, which are set to the fee amount to be stamped, by means of the intermediate wheels 14 and 16, as a result of the presetting of the starting positions of the racks 17 and 18.

After the presetting of the starting positions of the racks 17 and 18, the value setting devices 21 and 22 return into the initial position illustrated in FIG. 3, under the action of the springs 20. The frame 48 with the racks 17 and 18 is returned again into its initial position, illustrated in FIG. 1, by means of a spring (not shown), the toothings 36 and 39 then being in engagement with the toothed segment 40. If now the handle 42 of the shaft 41 is turned in the anti-clockwise direction, then the racks 17 and 18 are displaced towards the right, the stud 51 lying in the control groove 44 preventing rocking of the frame 48.

With the displacement of the rack 17 towards the right, as viewed in FIG. 4, the teeth of the toothing 35, which during the presetting have been moved below the pinion 27, now engage the pinion 27 of the units wheel 29 of the counting mechanism 26. If the presetting was effected through the numerical value 8, then the pinion 27 and consequently the units wheel 29 is rotated through eight tooth divisions. After this rotation, on further movement of the racks 17 and 18, the toothing 37 of the rack 18 comes into engagement with the pinion 30 of the tens wheel of the counting mechanism 26. If the rack 18 was preset through the numerical value 5, then the pinion 30 is displaced by five tooth divisions by the toothing 37, until the toothed segment 40 has reached its end position.

On running into this end position, the pin 51 passes out of the control groove 44, causing swinging of a pawl 61 against the action of a return spring 62. Simultaneously, the stud 56 of the toothed segment 40 presses on the lower end of the spring 55 and thus urges the upper end of the spring onto the stud 53 of the extension 52 of the frame 48. The frame 48 is thus swung downwardly so that the stud 51 of the extension 50 comes to lie in front of the control groove 45. In this displaced position (FIGS. 4d and 5d) toothings 63 and 64 on the lower edge of the racks 17 and 18 come into engagement with a wheel 65 which is in permanent mesh with the toothed segment 20 by means of two intermediate wheels 66 and 67. During the return movement of the rack 40 by rotation of the shaft 41 in the clockwise direction, the frame 48 is held in the displaced position, since the stud 51 lies in the control groove 45 of the plate 43. The racks 17 and 18 can thus be displaced back towards the left as viewed in FIGS. 4 and 5, into their initial position, since they are free of the pinions 27 and 30 of the counting mechanism 26. On moving into the initial position again, the stud 51 overcomes a pawl 69 which is loaded by a spring 68, the pawl 69 normally closing the end of the control groove 45.

Figure 5C:
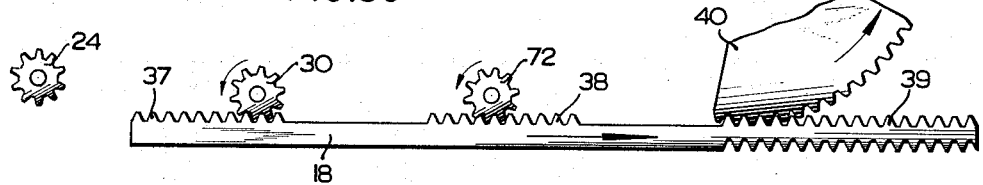
Figure 5D:
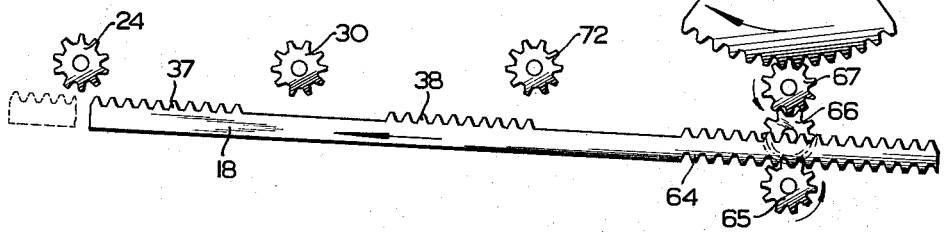

In addition to the counting mechanism 26, a further counting mechanism 70 is provided which works in the opposite sense to the counting mechanism 26. The control of the units and tens wheels of the counting mechanism 70 is effected in a similar manner as for the counting mechanism 26, through two pinions 71 and 72. The pinion 71 cooperates with part of the toothing 36 of the rack 17, whereas the pinion 72 cooperates with the toothing 38 of the rack 18 (FIG. 5c).

The arrangement thus far disclosed, in which the racks 17 and 18 of the units place and the decade place of the stamped fee amount are simultaneously displaced, for setting the counting mechanism, makes it necessary that the racks are preset in opposite directions, in accordance with the individual place values of the fee amount. The presetting in opposite directions complicates the arrangement.

In order to enable a presetting of the racks in the same direction, the embodiment illustrated in FIGS. 6 to 9 provides a different type of decadic transfer and a different construction of the drive, by which it is ensured that the racks of the individual fee value places are moved one after the other.

A rack 101 is arranged in a frame (not shown) corresponding to frame 48 shown in FIG. 1. Whereas a rack allocated to the unit place may be formed in the same manner as rack 17 shown in FIG. 1, the rack 101, which is allocated to the decade place of the fee amount, in addition to carrying a toothing 102 which can cooperate with a pinion 103 of a decade number wheel 104 of the counting mechanism, has also a supplementary tooth 106 on a rockable lever 105. The lever 105 is pivoted by a pin 107 on the rack 101 and is under the action of a spring 108 which normally holds the lever 105 in a position in which the supplementary tooth 106 is ineffective (see FIG. 6). The lever 105 carries an extension 109 which can cooperate with a control cam-surface 110 of a control member 111.

The control member 111 is rockably mounted on a fixed stud 112, the amount of possible rotation of the control member 111 being limited by the length of a cut-out 113 in the control member 111, in which a fixed stud 114 engages, the stud 114 simultaneously serving for anchoring a spring 115. The free end of the spring 115 acts on a pawl 116 which is rockably mounted on a fixed stud 117.

In the rest position, a projection 118 of the pawl 116 lies below a knee 119 of the control member 111 and the free end of the control member 111 extends into the movement path of a pin 120 of the number wheel 121 of the units place of the counting mechanism. If this units number wheel 121 is rotated from indicating the numerical value 9 to the indication of the numerical value 0, then the pin 120 carries the control member 111 therewith, so that it is swung out of the position illustrated in FIG. 6 and into the position illustrated in FIGS. 7 and 8. The control surface 110 of the control member 111 now lies in the movement path of the extension 109 of the lever 105, which carries the supplementary tooth 106.

Figure 6:
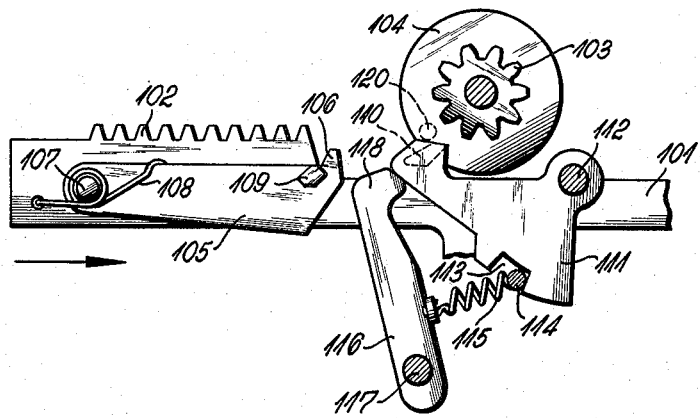
FIG. 6 illustrates a displacing device for the decadic transfer in a counting mechanism of a modified embodiment of the franking machine.
Figure 7:
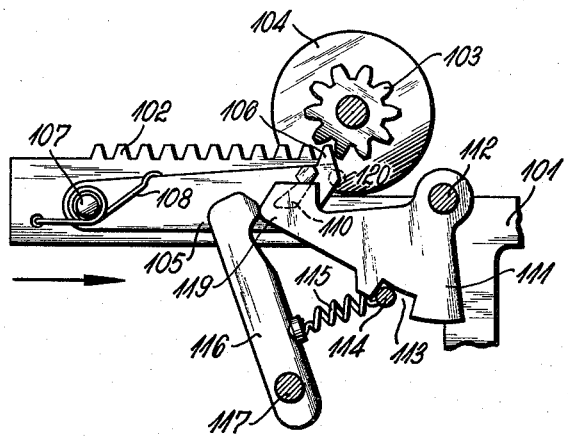
FIG. 7 is a view similar to FIG. 6, showing the components in a different position.
Figure 8:
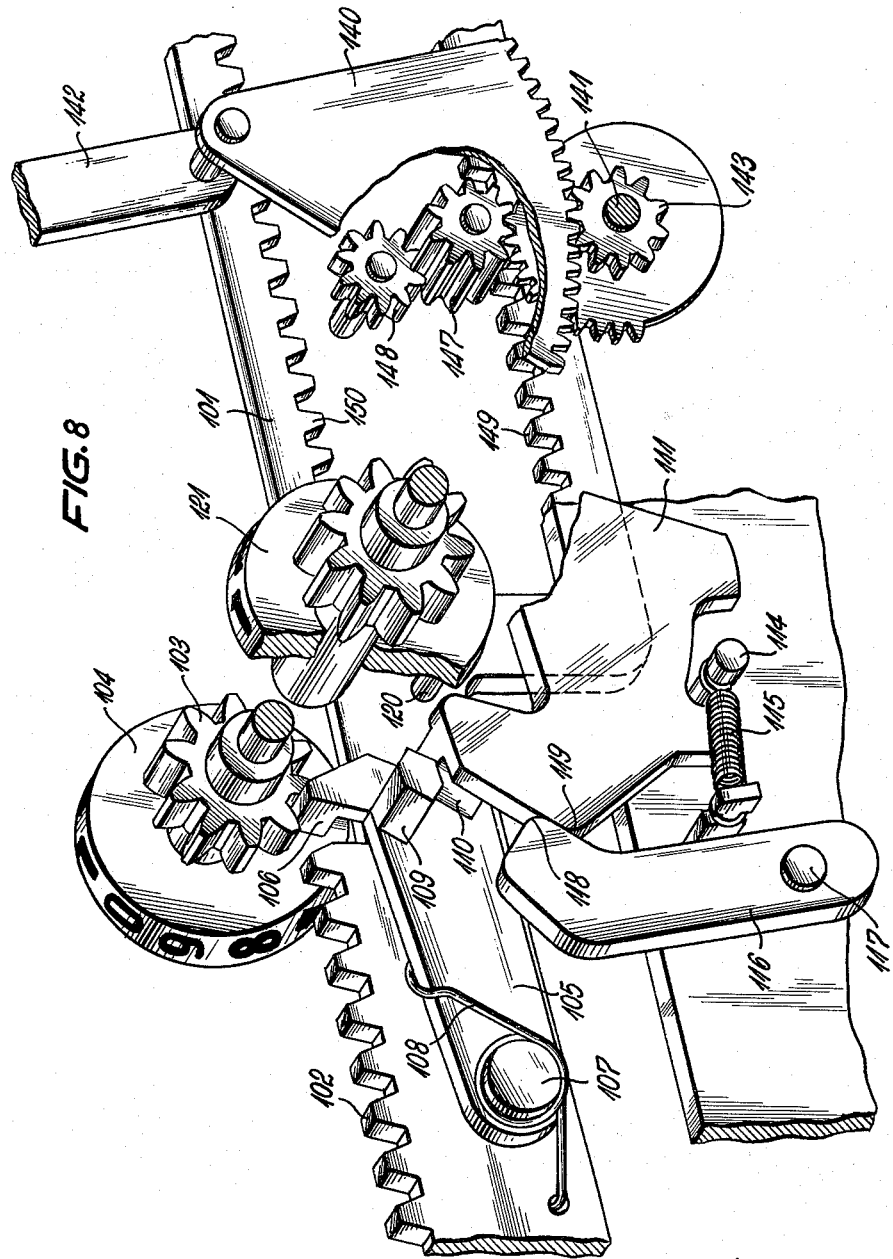
FIG. 8 is a perspective view of the displacing device of FIGS. 6 and 7.
Figure 9:
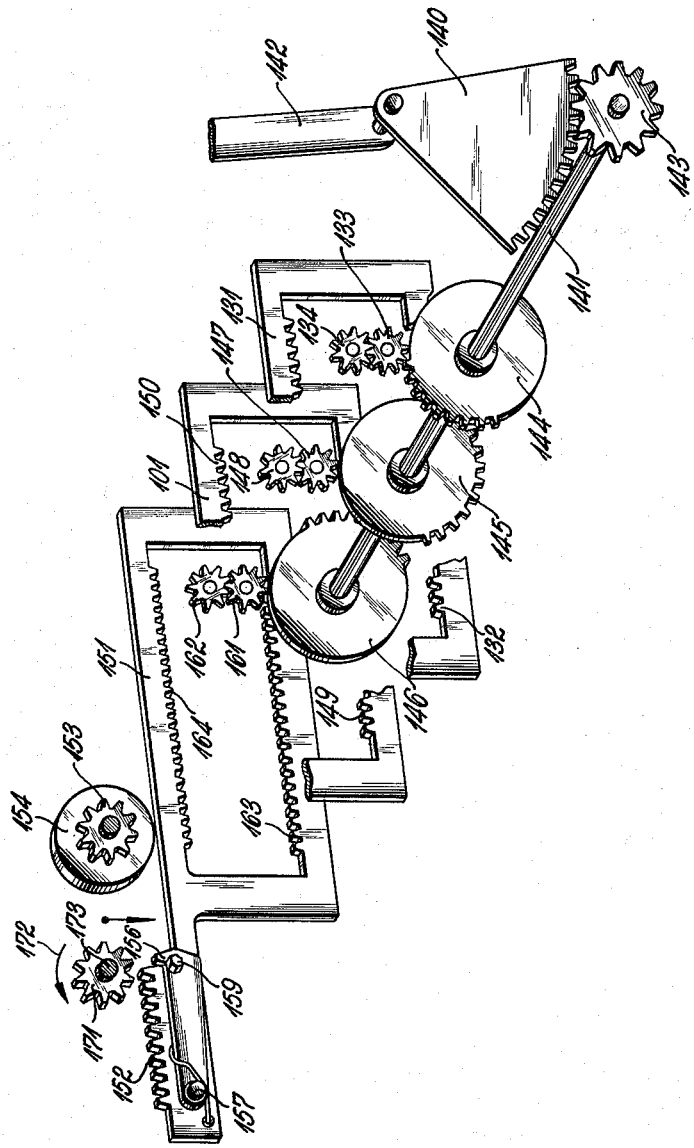
FIG. 9 is a perspective view of a driving device for racks of the embodiment of FIGS. 6, 7 and 8.

If the rack 101 is displaced towards the right hand side as viewed in FIG. 6, in a manner subsequently to be explained, then the extension 109 runs onto the control surface 110 and is lifted by this into the position illustrated in FIG. 7. The supplementary tooth 106 then lies at a distance of one tooth pitch in front of the toothing 102 of the rack 101, so that on further displacement of the rack 101 towards the right, the pinion 103 of the decadic wheel 104 of the counting mechanism is displaced by one additional step by means of the supplementary tooth 106.

The rack 101 is of frame-like shape and at the lower longitudinal frame edge has an internal toothing 149 and at the upper longitudinal frame edge has an internal toothing 150. Two pinions 147 and 148 are rotatably mounted on fixed studs in the space within the interior of the rack 101. The pinion 147 can cooperate with the internal toothing 149, whereas the pinion 148 can cooperate with the internal toothing 150, if the rack 101 has been swung downwardly. The pinion 147 can furthermore cooperate with a toothed wheel 145 which has a toothing at only part of its periphery.

For the units place of the fee amount, a rack 131 corresponding to the rack 101 is provided, in a frame-shaped part of which two pinions 133 and 134 are rotatably mounted on fixed studs. The pinion 133, which normally cooperates with a lower internal toothing 132 of the rack 131 can cooperate with a toothed wheel 144 which has a toothing at only part of its periphery.

When fee amounts having three numerical places are required to be allowed for, a further rack 151 is provided for the hundreds place of the fee amount, which likewise is similar to the rack 101. In a frame-like part of the rack 151, two pinions 161 and 162 are rotatably mounted on fixed studs, the pinion 161 being able to cooperate with an internal toothing 163 of the rack 151 and with a toothed wheel 146 which has a toothing at only part of its periphery.

The partial toothings of the toothed wheels 144, 145 and 146 are not in register with each other. All three wheels are fixedly arranged on a shaft 141 which carries a pinion 143 which meshes with a toothed segment 140 which can be rotated by means of a handle 142.

The relative offsets of the toothings of the toothed wheels 144, 145 and 146 ensures that on one rotation of the toothed segment 140, by means of the toothed wheel 144 and the pinion 133 firstly the rack 131 allocated to the units place of the fee amount is displaced towards the right. As soon as the displacement of the rack 131 has ended, the rack 101 of the decade place of the fee amount is displaced towards the right by means of the toothing of the wheel 145 and the pinion 147. When the displacement of the rack 101 has ended, then the rack 151, which is allocated to the hundreds place of the fee amount, is displaced towards the right by means of the toothing of the wheel 146 and the pinion 161. The displacement of the racks 131, 101 and 151, corresponding to the various numerical places of the fee amount are thus not effected simultaneously but are effected in a successive manner. It is thus possible that from the number wheel of a lower place, the control member 111 of the next higher place, on rotation of the said lower place number wheel, is swung by means of the pin 120 and thus the control of the supplementary tooth 106 or 156 of the next higher place is prepared, which then on displacement of the rack 101 or 151 acts to cause the rotation of the number wheel of the next higher place by an additional step for the purpose of decade transfer.

This possibility of decade transfer by means of a controllable supplementary tooth 106 or 156 of the rack 101 or 151, makes it possible that the racks 131, 101, 151 of all places of the fee amount can all be set in the same way and by movement in the same direction, to the desired setting value, when presetting. The presetting is effected by means of a pinion 171 (FIG. 9) of the allocated value setting device, by rotating the pinion in the direction of the arrow 172 through an amount complementary to the value to be set, after a shaft 173 of the value setting device has been lowered so far that the pinion 171 thereof comes into engagement with the toothing 152. By rotation of the pinion 171 in the direction of the arrow 172, the toothing 152 is brought into the proximity of the pinion 153. On displacing the rack 151 under the influence of the toothed segment 140, the toothing 152 is always moved by a fixed amount of ten tooth divisions towards the right as viewed in FIG. 9. In the position illustrated in FIG. 9, the value setting device is shown with its pinion 171 set to the value 0. If the rack 151 is displaced towards the right by ten tooth divisions, then the front tooth of the toohing 152 exactly reaches the pinion 153 of the number wheel 154 of the counting mechanism, without having rotated the same. If however on setting, for example the value 4, by means of the pinion 171 of the value setting device, the toothing 152 is displaced towards the right by four tooth divisions, then on the subsequent displacement of the rack 151 by ten tooth divisions towards the right, four teeth of the toothing 152 pass into contact with the pinion 153 and the number wheel 154 of the counting mechanism is rotated through four divisions.

If previously, by displacing the number wheel of the next lower place of the fee amount, the control surface of the allocated control member is displaced into the movement path of the extension 159 of the supplementary tooth 156, then on displacement of the rack 151, the supplementary tooth 156 is displaced into the effective position and accordingly the pinion 153 is rotated through an additional step, that is to say a total of five steps.

As a result of the section by section displacement of the individual racks of the various place values of the fee amount, all racks 131, 101 and 151 can be successively preset in accordance with the desired setting values, by movement in the same direction. Thus, the embodiment illustrated in FIGS. 6 to 9 is especially suitable for large fee amounts, that is to say for fee amounts with three or more numerical places.

Obviously, many modifications may be made without departing from the basic spirit of the present invention; and therefore, within the scope of the appended claims, the invention may be practiced other than has been specifically described.

I claim:

1. A franking machine comprising a counting mechanism for operation in accordance with the stamped fee amount, a plurality of number wheels forming part of said counting mechanism and allocated to various numerical places of the fee amount, at least two displaceable racks, each for one of said number wheels of said counting mechanism, means enabling coupling of said racks with said number wheels, setting devices for setting said racks to starting positions prior to coupling of said racks with said number wheels, stamping-value setting devices, one for each rack, said setting devices each having a pinion, a shaft mounting said pinion for rotation thereon, means guiding said shaft for movement towards the relevant rack, and spring means opposing said movement of said shaft.

2. A franking machine as defined in claim 1, wherein each setting device comprises a number wheel rigid with said pinion and a manual operating wheel rigid with said pinion.

3. A franking machine as defined in claim 1, comprising a plurality of franking wheels, one for each rack, a gear wheel rigid with each franking wheel, an intermediate gear wheel meshing with each said gear wheel, and means mounting said intermediate gear wheels for engagement by said setting device pinions on said movement of the setting device shafts.

4. A franking machine comprising a counting mechanism for operation in accordance with the stamped fee amount, a plurality of number wheels forming part of said counting mechanism and allocated to various numerical places of the fee amount, at least two displaceable racks each for one of said number wheels of said counting mechanism, means enabling coupling of said racks with said number wheels, setting devices for setting said racks to starting positions prior to coupling of said racks with said number wheels, a frame, means slidably guiding said racks in said frame, a shaft disposed substantially parallel to the axis of said counting mechanism and rockably mounting said frame, a toothing on each of said racks, a toothed segment, means for bringing said racks jointly into engagement with said toothed segment by their said toothings, means for rotating the toothed segment for driving the racks, a pinion rigid with each of the said two number wheels of the counting mechanism, and a further toothing on each of said racks disposed for engagement with said number wheel pinions.

5. A franking machine as defined in claim 4, and comprising a shaft carrying said toothed segment, a segment shaped plate mounted on said shaft, said plate having two control grooves, and a projection on said rockable frame and disposed for entering into one of said control grooves on forward rotation of said toothed segment and into the other of said control grooves on backward rotation of said toothed segment.

6. A franking machine as defined in claim 4, and comprising reversing gear means in engagement with said toothed segment, and an additional toothing on each rack disposed for engagement with said reversing gear means in a given rocking position of said rockable frame.

7. A franking machine as defined in claim 4, and comprising a resilient force transfer member, a stationary support carrying said resilient force transfer member, a projection on said toothed segment and in engagement with said resilient force transfer member and a projection on said frame and engaged by said resilient force transfer member.

8. A franking machine comprising a counting mechanism for operation in accordance with the stamped fee amount, a plurality of number wheels forming part of said counting mechanism and allocated to various numerical places of the fee amount, at least two displaceable racks, each for one of said number wheels of said counting mechanism, means enabling coupling of said racks with said number wheels, setting devices for setting said racks to starting positions prior to coupling of said racks with said number wheels, toothings on said racks, pinions rigid with at least said two number wheels and engageable by said rack toothings, means providing a supplementary tooth, one for each rack, with the exception of the rack allocated to a first number wheel of the plurality, means mounting said supplementary tooth retractably on each rack, and means controlling release of each said supplementary tooth from a retracted position on rotation of the number wheel preceding the number wheel allocated to the rack in question.

9. A franking machine as defined in claim 8, wherein said controlling means for each rack fitted with a supplementary tooth, comprise an actuating member rockably mounted on said frame for movement between two end positions, a pawl adapted for holding said actuating member in either of its two end positions, a projection carried by the preceding number wheel and positioned for rocking the actuating member, a control surface on said actuating member, and a projection on said supplementary tooth mounting means and disposed for engagement by said control surface on rocking of said actuating member.

10. A franking machine as defined in claim 8, and comprising a toothed segment, means mounting said toothed segment rotatably, further toothings on said racks, a drive shaft, a pinion on said drive shaft and engaged by said toothed segment, and toothed wheels on said drive shaft for driving said racks by said further toothings, said toothed wheels having toothings over part only of their periphery, said peripheral parts being angularly different for each toothed wheel.

References Cited by the Examiner

UNITED STATES PATENTS

| 1,240,218 | 9/17 | Jacob | 235—101 |
| 1,257,620 | 2/18 | McCaleb | 235—60.31 |
| 1,358,427 | 11/20 | Ekman | 235—133 |
| 1,878,125 | 9/32 | Fuller | 235—60 |
| 1,896,182 | 2/33 | Luttropp | 235—60 |
| 2,034,345 | 3/36 | Kottmann | 235—60 |
| 3,166,243 | 1/65 | Torre | 235—61 |

LEO SMILOW, *Primary Examiner.*

LEYLAND M. MARTIN, *Examiner.*